Nov. 17, 1970    D. M. KERCHER    3,540,810
SLANTED PARTITION FOR HOLLOW AIRFOIL VANE INSERT
Filed March 17, 1966
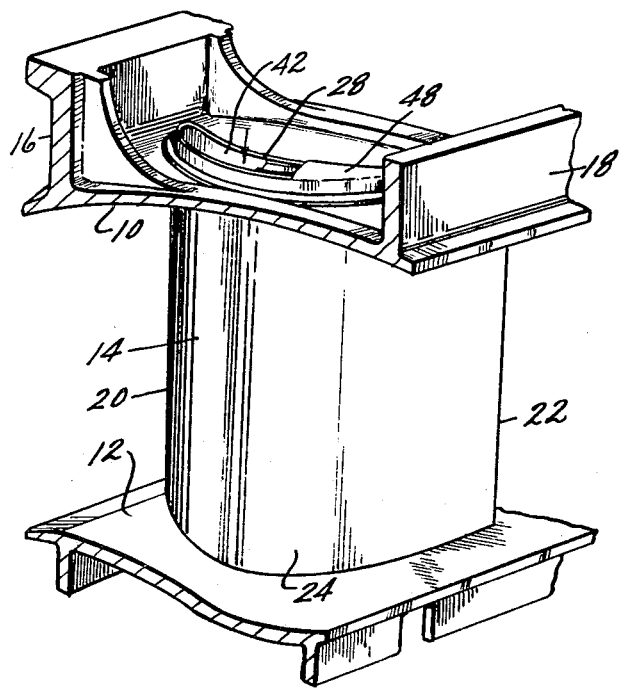
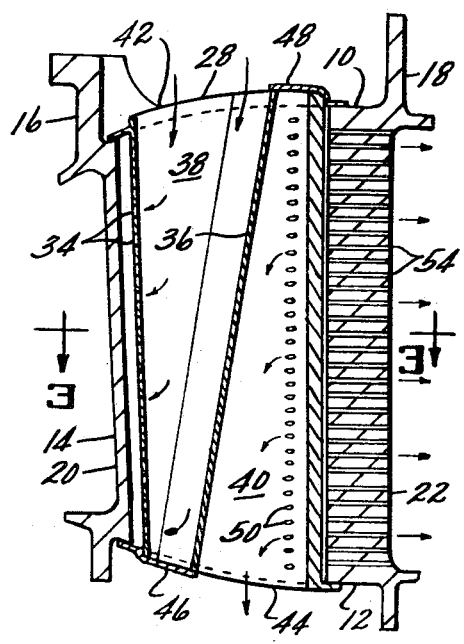
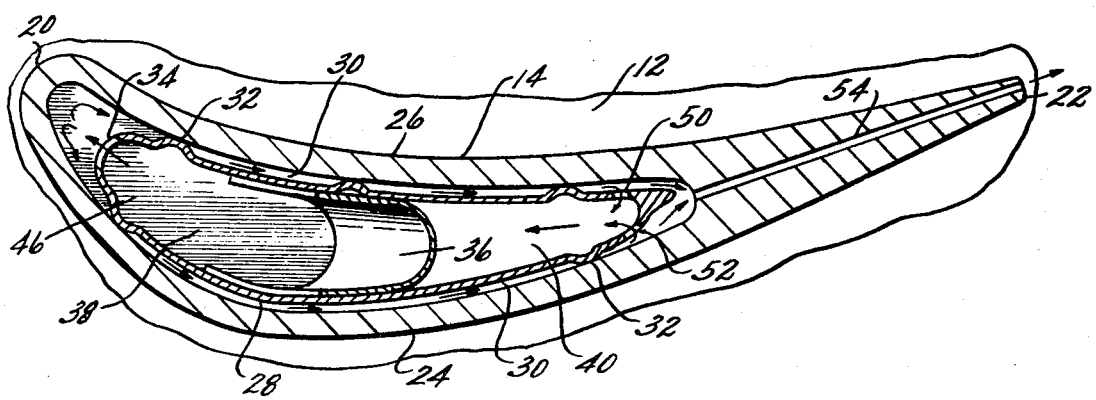
INVENTOR.
DAVID M. KERCHER
BY
ATTORNEY

United States Patent Office

3,540,810
Patented Nov. 17, 1970

3,540,810
SLANTED PARTITION FOR HOLLOW AIRFOIL
VANE INSERT
David M. Kercher, Cincinnati, Ohio, assignor to General
Electric Company, a corporation of New York
Filed Mar. 17, 1966, Ser. No. 535,064
Int. Cl. F01d 25/12
U.S. Cl. 416—90                    7 Claims The present invention relates to airfoil vane structure and, more particularly, to such structure employing hollow vane means with an insert for predetermining minimum fluid flow for adequate cooling of jet engine parts such as turbine diaphragms.

In present day high temperature machine parts, such as the turbine blades or vanes in jet engines, whether rotating or stationary, it is necessary to provide cooling arrangements. It is possible to design engines that operate efficiently at gas temperatures much higher than the materials are able to withstand. Thus, adequate cooling schemes must be devised and structures designed which permit operation at elevated gas temperatures beyond the capacity of the material.

Various nozzle vane structures have been designed to permit the circulation of cooling fluids and adequately reduce temperatures. Typically, some designs employ cast-in cooling passages wherein cooling fluids are circulated through the passages within the walls of the particular componenut such as a turbine bucket or vane. The difficulty with such designs is that the amount of fluid required in relation to the wall thickness is such that very small wall thickness is left between the individual cooling passages and the blade surfaces. The result is that temperature gradients occur producing thermal stress concentrations which often result in cracking and inadequate life.

A more optimum design for high temperature application has proven to be hollow designs that are either fabricated or cast. On thin wall constructions means, such as inserts, are provided to confine and guide the cooling fluid adequately to cool the surface of the vane exposed to the hot fluids. Generally, in such structures the insert acts as a plenum to collect the incoming cooling fluid and discharge it substantially equally within the airfoil vane to flow along the surfaces towards the trailing edge and then use it to cool the trailing edge by flowing it through or on one side or the other thereof and then discharge it into the cycle to avoid losses. A difficulty is that different parts of the cooled element are not at the same temperatures due to different heat loads imposed. In other words, in an airfoil vane, the suction or convex side of the airfoil is generally hotter than the pressure or concave side, and yet both sides are cooled substantially with equal cooling flow. This tends to overcool the pressure surface and undercool the suction surface. As a result stresses are set up between the sides as well as making the hot suction side the determining factor even though the pressure side may require less cooling.

The main object of the present invention is to provide a fluid directing element in the shape of an airfoil vane wherein each vane is hollow and has an insert disposed therein to guide cooling fluid, the insert being so formed to predetermine the flow through passages between the insert and the hollow blade.

Another object is to provide such a structure as may be used in a turbine diaphragm wherein the parts may be of uniform thickness for uniform thermal expansion and yet the cooling flow is kept at a minimum and particularly directed to do the most efficient cooling.

A further object is to provide such a structure wherein the insert of the hollow vane means is formed to provide two plenums that provide constant static pressure which, in turn, ensures substantially constant flow for cooling purposes.

Another object is to provide such a structure wherein the insert in the hollow vane performs the multiple functions of forming passages, forming plenums, and providing constant static pressure and uniform flow with minimum air for cooling purposes.

Briefly stated, the invention provides a fluid directing element for turbomachinery in which the element is a hollow airflow vane having leading and trailing edges. Disposed within the hollow vane is a hollow thin walled insert that extends from the top to the bottom of the vane and is spaced from the vane inner surfaces to define passages. A slanted partition is provided in the insert to extend from the top to the bottom of the insert and forms a single forward and aft plenum of constant static pressure throughout each plenum. Each plenum has a wide portion at the opposite end from the adjacent plenum. Fluid directing means is provided for fluid entry and exit at the wide portions. The insert is provided with apertures oriented to discharge fluid from the forward plenum onto the leading edge inner vane surface for impingement cooling and to spread and flow the fluid through the passages between the insert and the vane toward the trailing edge. The insert also has second apertures at the aft end to discharge a predetermined partial amount of fluid from the passages into the aft plenum. The remainder of the fluid is then directed out trailing edge slot means for cooling of the trailing edge of the vane. The insert is supported within the vane by spaced deformations in the insert so that the passages are of predetermined size. Further, the two plenums are closed or capped at the opposite end of their wide portions so that all fluid is forced from the plenums.

While the specification concludes with claims particularly pointing out and distinctly claiming the subject matter which is regarded as the invention, it is believed the invention will be better understood from the following description taken in connection with the accompanying drawings, in which:

FIG. 1 is a perspective view of a typical nozzle vane as used in a turbine diaphragm, FIG. 2 is a cross sectional view through the vane of the invention, and FIG. 3 is a cross sectional view taken on the line 3—3 of FIG. 2.

The present structure is described for convenience as one of the vanes of a turbine diaphragm structure but it will be appreciated that the specific structure described may have application elsewhere such as struts or other engine components or airfoil structure requiring similar cooling capacities.

Referring first to FIG. 1, there is shown a single vane of a turbine diaphragm structure including outer band 10 and inner band 12 having a nozzle vane 14 between the bands. Vane 14 is a fluid directing element of an airfoil shape as is well known. It will be appreciated that a multiplicity of the vane elements of FIG. 1 may comprise the turbine diaphragm structure that extends completely around an annulus downstream of a combustor in a jet engine and receives the hot combustor gases. Additionally, such a nozzle vane may be employed as other stages in a multi-stage application. They direct the hot gases onto the rotating buckets, not shown, in the usual manner. Ease of assembly and lower cost construction has indicated that the diaphragm structure may conveniently be made in segments of multiple vanes or single vanes as shown in FIG. 1 and the segments can be cast with the individual nozzle vanes 14 therein and a multiplicity are then joined to form a circle.

For adequate cooling of the individual vanes below the main gas temperature, it is necessary to cool the vanes with a fluid, such as compressor bleed in a gas turbine, or other suitable available fluid at a lower temperature than the exhaust gases. Referring to FIG. 2, the bands may have upstream flanges 16 and downstream flanges 18 to abut the normal adjacent engine structure in the conventional manner. Similar flanges may be provided on the inner band 12 for supporting internal sealing structure in a known manner. To keep the costs reduced and obtain high heat transfer coefficients for adequate cooling, it is possible to cast the whole structure shown in FIG. 1 and bolt individual segments together as previously noted.

Reference is now made to FIG. 3 showing a cross section of an individual fluid directing element or hollow airfoil vane 14. In the normal nozzle structure the hollow vane 14 is of airfoil shape and has a leading and trailing edge 20 and 22 respectively. The airfoil shape provides a suction or convex surface 24 and a pressure or concave surface 26. In normal expected turbine operation, surface 24 is exposed to higher outside surface heat transfer coefficients than is surface 26 and therefore requires more internal cooling.

Cooling fluid from a suitable source, such as compressor bleed, is brought to the individual vane means in any conventional manner. In order to distribute the fluid properly within the thin walled vane means there is provided therein an insert 28. This insert has multiple functions as will become apparent as the description proceeds. As seen in FIG. 2, the incoming fluid flow is particularly directed within the insert 28 for the most efficient cooling with the minimum amount of air as will be explained. The insert 28 may be suitably welded or otherwise secured as a one-piece structure so that all of the fluid for cooling is forced into the interior of the hollow insert which extends from the top to the bottom of the vane. The cooling fluid is distributed to cool the nozzle vanes 14 by spacing the insert 28 from the suction and pressure surfaces 24 and 26 so as to define fluid passages 30 along the inner side of the airfoil surfaces between the airfoil and the insert as seen in FIG. 3. In order to support the insert in a predetermined spaced relation to define the size of the passages 30, spaced deformations 32, which may be buttons or ribs, are struck out of the insert walls. Inasmuch as the incoming fluid is at a higher pressure than that in the passages 30, it is necessary to support the insert against distortion and the deformations 32 not only predetermine the size of passage 30 but also provide that support. Consequently, the deformations serve the multiple purposes of maintaining the passages 30 of the desired predetermined depth and providing rigidity and axial location to the insert 28. If ribs are used, they also provide guiding means for the fluid. It has been found that impingement cooling along the hot leading edge 20 is more effective than cooling obtained by flow parallel to the edge and for this purpose, the leading edge of the insert 28 is provided with a series of openings, such as apertures 34, oriented to direct all the fluid from the insert and discharge it by impingement on the leading edge inner surface of the vane so that it spreads to flow rearwardly through the passages 30 toward the trailing edge as shown in FIG. 3.

With such cooling, difficulties are presented in getting substantially constant flow throughout the series of apertures along the length of the leading edge because of the pressure drop of the fluid in the insert. To overcome this, the insert is provided from top to botttom with a slanted partition 36 which forms a single forward plenum 38 and a similar aft plenum 40. With the slant of the insert, it is possible to provide constant static pressure within the two plenums. As shown in FIG. 2, it will be apparent that the two plenums therefore have a wide portion at opposite ends from each other. It is preferred that the fluid enter and exit from these wide portions so any fluid directing means 42 and 44 is provided for the entry and exit of the fluid respectively. Of course the directing means 42 and 44 may be sized in order to control or throttle the flow to the amount desired for other purposes, such as sealing, after exit from the vane out of aft plenum 40.

In order to channel the cooling fluid properly, and force it out of the plenums, each of the plenums is provided with a sealing means such as cap 46 and 48 at the narrow or end opposite the wide portions. Thus, the forward plenum 38 is at substantially constant static pressure by its slanted partition 36 and the flow from each of the apertures 34 lengthwise of the leading edge is substantially constant.

When the flow impinges on the inner surafce of the leading edge 20 and flows rearwardly through passages 30 there will be uniform cooling of all parts of the blade because of the constant static pressure source in plenum 38 and the constant flow resulting therefrom. The remainder of the vane is cooled by the flow through passages 30 toward the aft or trailing edge. In order to fill and then discharge the fluid from aft plenum 40 there is provided a second series of oppositely disposed apertures 50 and 52 respectively. These apertures are sized to predetermine the flow through the corresponding passages 30 and it will be seen that if more apertures 52 or larger apertures 52 are provided the flow through the passage 30 increases and the hotter suction surface 24 will receive more flow. Additionally, the passage 30 may be made larger on the suction side to increase the flow if desired. Thus, apertures 50 and 52 also predetermine the flow through passages 30 so the cooling flow may be divided as desired depending on the temperatures desired. These apertures are designed to take part of the flow from passages 30 and allow the remainder of the flow to be exhausted into trailing edge slot means 54 for cooling of the trailing edge. Thus, part of the flow from passages 30 is metered into aft plenum 40 where it is subsequently discharged through its exhaust or directing outlet means 44 and further directed to a point of use such as in a sealing structure or elsewhere. The remainder of the flow exits through slots 54. It will be noted that the single slanted partition operates to provide constant static pressure in each of the plenums and in the subsequent constant flow so that both plenums work together. In other words, the single partition puts the wide part of plenum 38 opposite the narrow part of plenum 40 and vice versa resulting in a uniform extraction of the fluid through apertures 50 and 52 so that with constant lower static pressure in the aft plenum the inflow to that plenum is also constant.

It will be seen that the dividing of the insert into forward and aft plenums by the slanted partition 36 thus provides substantially constant static plenum pressure throughout the vane with the result that the flow out of the forward plenum 38 is constant and the flow into the aft plenum 40 is constant resulting in very uniform cooling and reduction of stresses. Furthermore, all of the fluid available is used for cooling and a minimum amount is required by maintaining the constant static conditions described. Generally, the plenums will be of substantially equal volume for handling the fluids although equal volume is not required. By predetermining the amount of flow through the passages 30 the cooling fluid may be directed to the point of most need. Further, the adequate cooling of the mid-chord section of suction surface 24 results in less cooling required at the trailing edge and thus smaller trailing edge slots 54 and fewer may be used. The arrangement extracts the maximum heat transfer capability out of the cooling fluid before it is used for other purposes. This maintains the smallest possible usage of the fluid for cooling purposes which results in a better engine cycle when used in a gas turbine engine since the least amount is being withdrawn from the cycle.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. A fluid directing element for turbomachinery comprising,
a hollow airfoil vane having leading and trailing edges,
a hollow thin walled insert disposed in said vane and spaced therefrom to define passages,
a slanted partition extending from substantially one end to the other within said insert and forming a single forward and aft plenum of constant static pressure therein,
said insert having apertures oriented to discharge fluid from the forward plenum onto the leading edge inner vane surface to spread and flow through said passages toward said trailing edge,
said insert having second apertures at the aft end to discharge some fluid from said passages into said aft plenum,
means to discharge the remaining fluid adjacent the trailing edge and,
means connected to said plenums for fluid entry and exit.

2. Apparatus as described in claim 1 wherein said insert has spaced deformations in its walls supporting said insert in predetermined spaced relation to said airfoil.

3. Apparatus as described in claim 1 wherein said insert has sealing means at opposite ends in each plenum to force all fluids therein from said plenums.

4. A fluid directing element for turbomachinery comprising,
a hollow airfoil vane having leading and trailing edges,
a hollow thin walled insert disposed in said vane and extending from top to bottom thereof and spaced from the vane inner surface to define passages,
a slanted partition extending from top to bottom in said insert and forming a single forward and aft plenum of constant static pressure throughout each plenum therein
each plenum having a wide portion at oposite ends from one another,
fluid directing means at said wide portions,
said insert having apertures oriented to discharge fluid from the forward plenum onto the leading edge inner vane surface to spread and flow through said passages toward said trailing edge,
said insert having second apertures at the aft end to discharge a predetermined amount of fluid from said passages into said aft plenum, and
trailing edge slot means discharging the remainder of the passage fluid.

5. Apparatus as described in claim 4 wherein said insert has spaced deformations in its walls supporting said insert in predetermined spaced relation to said airfoil.

6. Apparatus as described in claim 4 wherein said insert has cap means on each plenum at the end opposite said wide portion to force all fluid therein from said plenums.

7. Apparatus as described in claim 4 wherein said forward and aft plenums are of substantially equal volume.

References Cited

UNITED STATES PATENTS

| 2,514,105 | 7/1950 | Thomas. |
| 2,647,368 | 8/1953 | Triebbnigg et al. |
| 2,746,671 | 5/1956 | Newcomb. |
| 2,847,185 | 8/1958 | Petrie et al. |
| 2,859,011 | 11/1958 | Zimmerman. |
| 2,866,618 | 12/1958 | Jackson. |
| 2,873,944 | 2/1959 | Wiese et al. |
| 2,879,028 | 3/1959 | Stalker. |
| 2,920,866 | 1/1960 | Spurrier. |
| 3,032,314 | 5/1962 | David. |

SAMUEL FEINBERG, Primary Examiner

U.S. Cl. X.R.
415—115; 416—97, 232